United States Patent Office 3,311,135
Patented Mar. 28, 1967

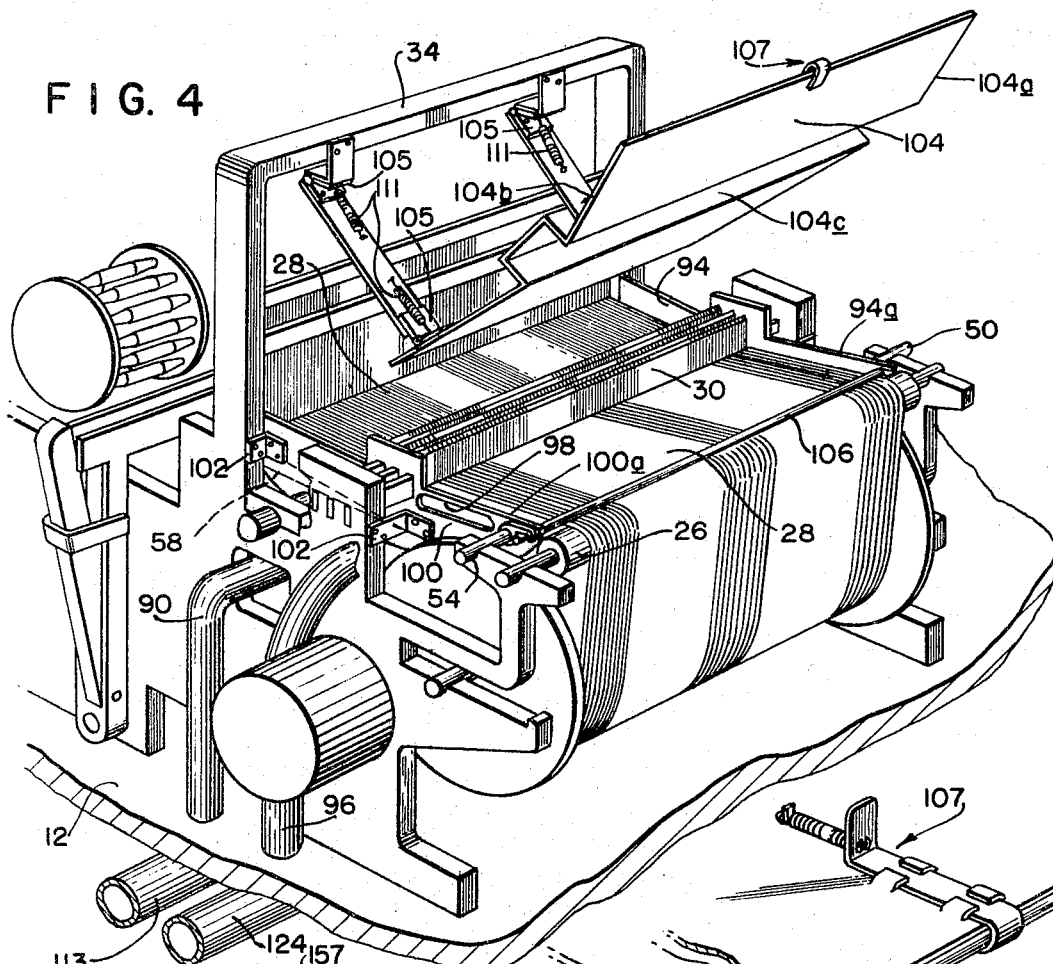
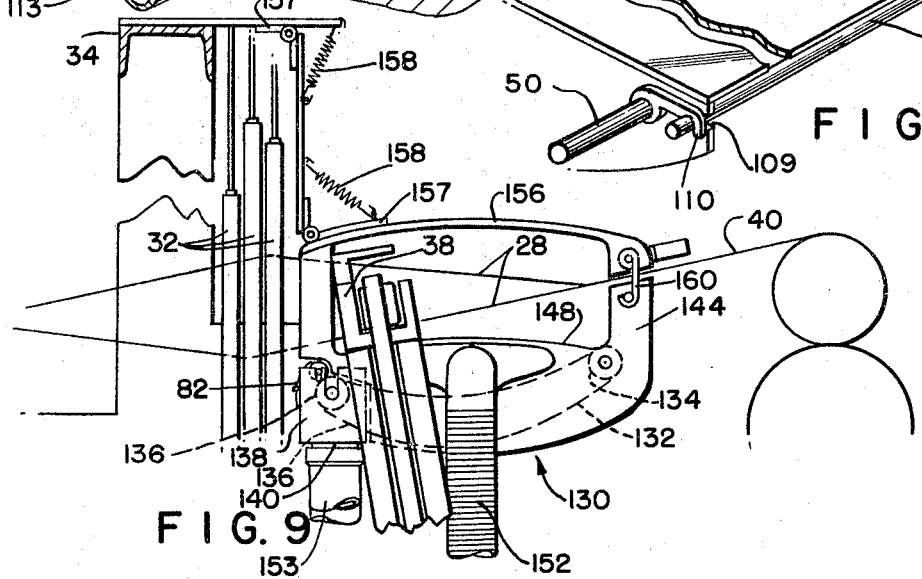

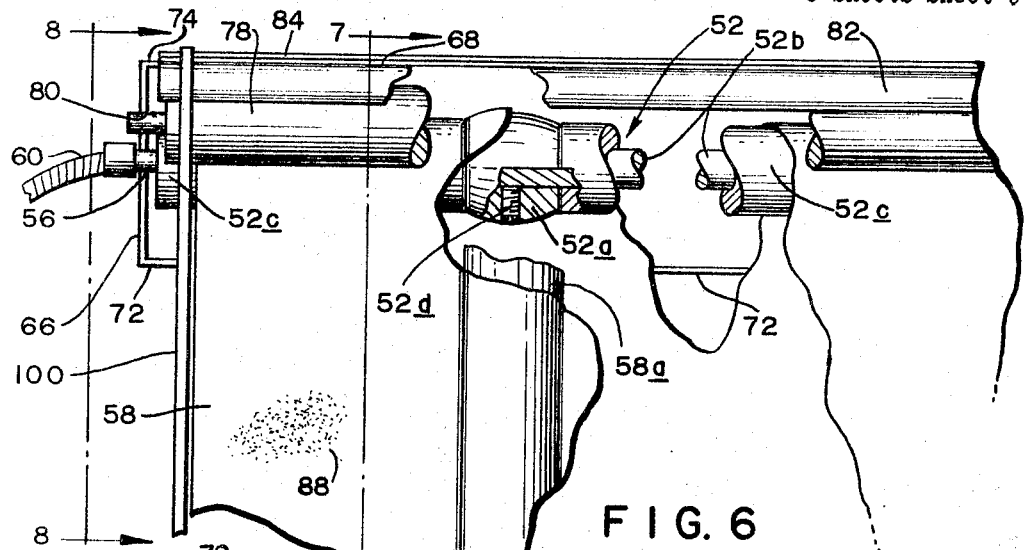
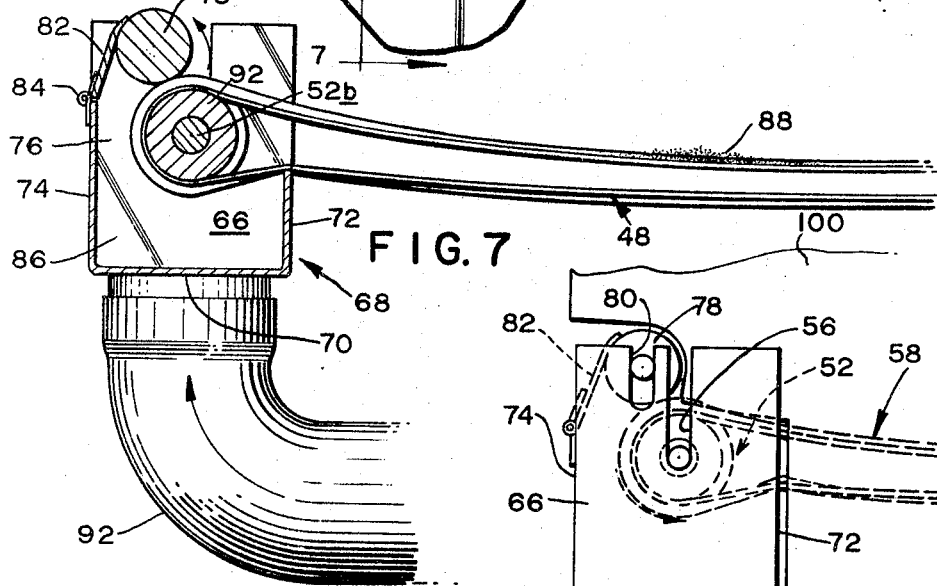
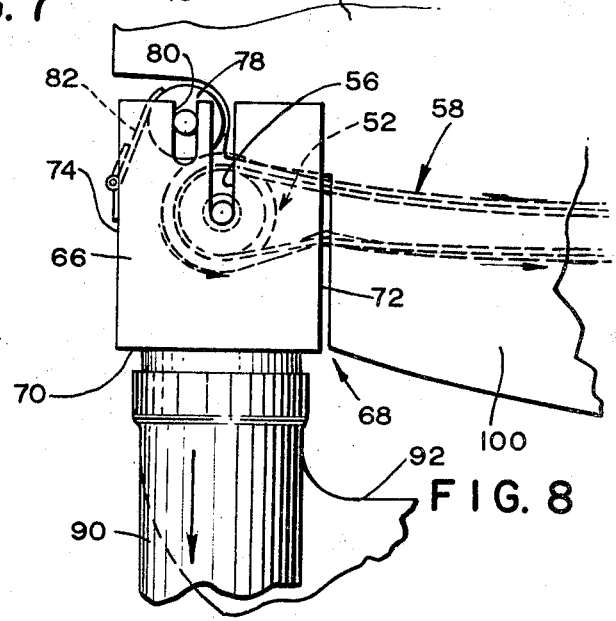

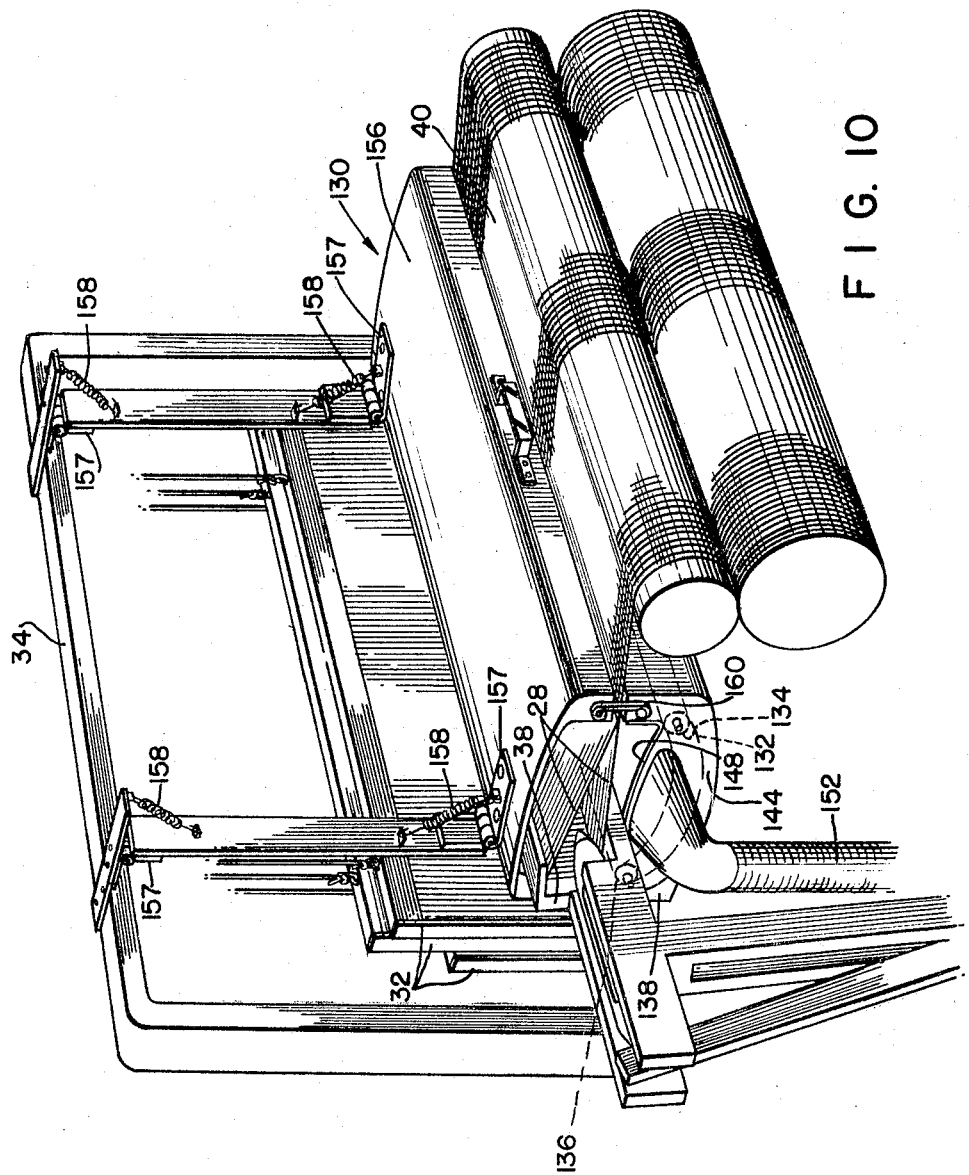

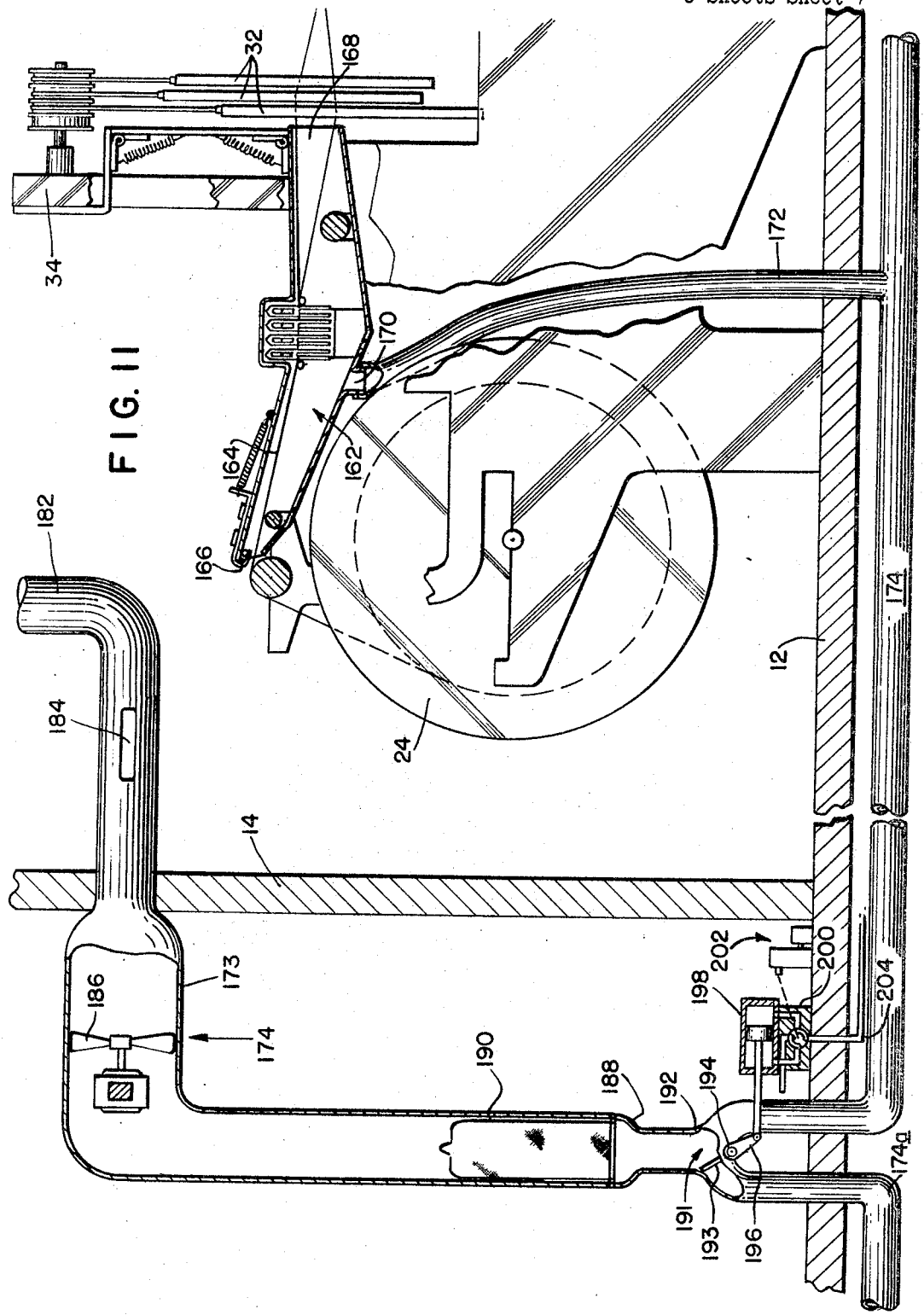

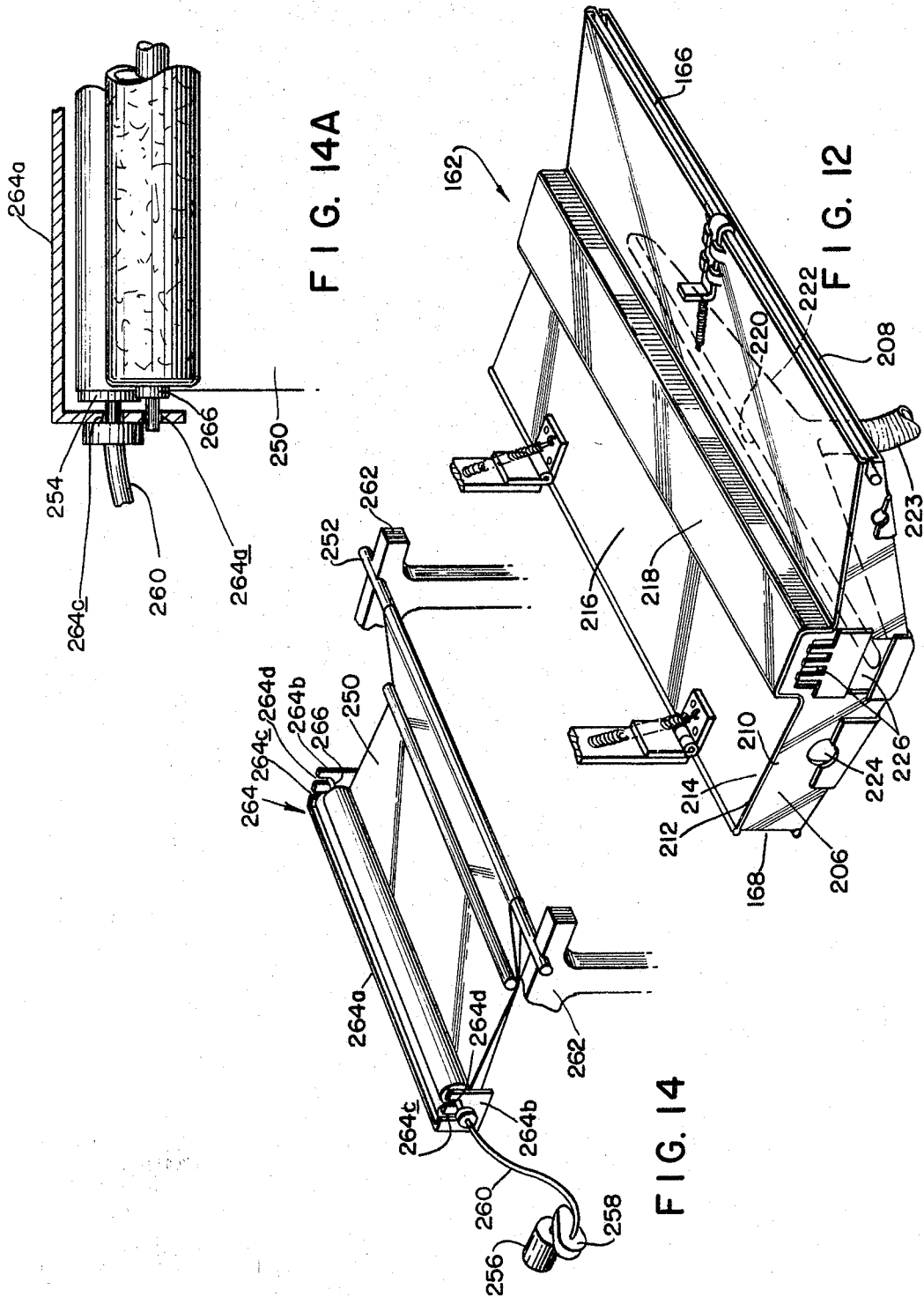

3,311,135
LINT COLLECTING ENCLOSURE
Philip F. Maguire, Jr., Providence, and Lionel A. J. Sousa, Coventry, R.I., assignors to Grinnell Corporation, Providence, R.I., a corporation of Delaware
Filed June 24, 1965, Ser. No. 466,653
36 Claims. (Cl. 139—1)

This invention relates to improvements in apparatus for cleaning textile looms. Thus, it has to do with equipment which substantially encloses the warp strands in those regions where a significant part of the lint and fly are generated from these strands and which provides for transportation of the lint and fly within the enclosure for removal therefrom. This invention also has to do with the use of these enclosures to maintain a particular air condition at the warp strands and with improvements in overall systems for collecting lint from, and for conditioning air at, a plurality of looms equipped with such enclosures.

Lint and fly (hereinafter referred to merely as lint) are textile fibers which have become separated from the textile itself and on a loom are generated from the warp strands at a number of locations especially including the places where these strands engage the drop wires, the heddles, the reed, and the lay. Lint is also generated to some extent from the filling, and until recently there was a general feeling in the industry that since lint is released into the air from so many sources the best approach to loom cleaning was to sweep up the lint after it escapes into the air and lands on the floor. One difficulty is that the lint is light enough to drift with the air currents in the weave room and frequently comes to rest on other objects therein such as the walls and ceiling thereof and on the exposed parts of the looms themselves. Because of the coating of starch which is on the textile and which makes the lint tacky, particularly in view of the high relative humidity maintained, the lint readily adheres to the surfaces of all these objects on which it comes to rest. If no steps are taken to remove this lint continued deposit thereof eventually results in thick layers covering the surfaces referred to, and to prevent this lint build-up the procedure has been to blow the lint off these surfaces with suitable fan equipment applied at frequent intervals, the hope being that the lint dislodged by the air blasts will reach the floor from which it can be collected by sweepers. Some of it does. Some lands back on the looms and on the walls and the ceiling of the room and has to blown off again, and so on.

Lint is objectionable because the thick layers eventually interfere with loom operation by clogging the loom mechanisms or falling in bunches onto the textile being woven. These occurances are harmful to the looms and reduce cloth quality. Similarly accumulations of this highly flammable material are at least a fire hazard.

The cleaning approach which was above described, and which is used in many mills today, is one of the best which has been devised so far, but it is not ideal because it allows the lint and fly to disperse into the room at large before any collection is attempted, and though many of the blowing devices now available are quite sophisticated, they still resemble the hand-held hose to the extent that they direct air blasts against the lint accumulating surfaces in the rooms, and any gathering-up of the lint is left to floor sweepers. Furthermore, when directed onto the looms these air blasts must be carefully controlled and frequently repeated to avoid actuating the sensitive loom stop motions, and although the most recent blowing devices have been greatly improved in this respect, it would be preferable to avoid blowing devices altogether, or at least greatly minimize the necessity for their use, and still keep the weave shed lint-free.

One answer has been a recent proposal to clean the looms by providing each with at least one generally horizontal sheet surface which is located beneath the major lint generating regions of the loom and which is extensive enough both to block any air currents rising into these regions and to intercept the lint falling down onto this surface. For example, wide flexible belts have been located under the loom warp strands to receive and support lint falling from these strands.

Mere provision of a collecting surface is not enough, however, because the lint build-up on this surface can again result in a fire hazard or interference with the loom, and these prior "surface" proposals have further involved mechanically moving the supported lint to a stationary lint gathering device which is located to one side of or occupies one limited portion of the total sheet surface, usually along one edge thereof. This mechanical movement of the lint on the sheet surface has been found desirable because attempts to concentrate the lint in other ways, for example, by moving a gathering device across the sheet surface or applying suction to the entire surface from a stationary manifold, have not been particularly successful. No suction system of reasonable size can draw in lint from the entire sheet surface or even from a significant portion of it, and any efforts to blow lint from the surface toward and into a collection chamber, for example, by locating a pressure source nozzle opposite an entrance to such a chamber, would collect only a small proportion and would merely scatter the rest in the fashion of the overhead fan equipment.

Although these prior "surface" proposals have been impressively successful in their initial trials, and it is expected that they shall come into widespread use in the textile industry, one limitation has been their dependence on the lint's falling downward onto the collecting sheet surface. Horizontal air currents, not uncommon around looms, will carry significant quantities of this lint beyond the edges of the sheet surface to fall on loom parts or on the floor.

I have been surprised to discover that by far the greatest portion of the lint generated by a loom is produced in regions which can be effectively enclosed in housings of small volume, that such housings will prevent the escape of the lint into the room at large, that such housings can be constructed so as not to interfere with the normal loom operation and the usual services performed thereon, and that the atmosphere within such housings can be moved and treated to collect the lint and to provide the proper air conditions.

Thus, in one embodiment of my invention this housing enclosure equipment has for its underside an endless belt, of the kind previously proposed, which is located under the warp strand layer and which extends from a point adjacent the whip roll, beneath the drop wires, and to a point adjacent the heddles. Preferably this belt has a width somewhat greater than that of the warp strand layer, and from each of its edges a stationary vertical wall extends upwardly along the entire side of this layer to a level thereabove. The enclosure is completed by a top cover engaging the upper edges of the vertical walls and preferably hinged to the loom arch and substantially coextensive with the belt. The "back" edge of this cover is located adjacent the intersection of the warp strand layer and the heddles and from this edge the cover extends over the drop wires to the "front" edge in the vicinity of the whip roll.

The result of this construction is that the only enclosure openings are those narrow ones which admit and discharge the warp strand layer and any slight clearances between the sides of the moving belt and the lower edges of the vertical side walls. The endless belt encircles and is supported by spaced apart rollers parallel to the whip roll and one of which is dirven so that the upper belt layer moves (very slow movement is sufficient) toward the heddles where there is elongated stationary suction manifold (in the manner of the prior art) drawing from the belt surface any lint resting thereon. From this manifold an air duct leads to lint filtering equipment. The same air from this equipment may be treated and returned to the enclosure through another duct.

In this above-described embodiment the lint in the enclosure is moved primarily by the belt. The enclosure acts to prevent lint generated therein from falling on some surface other than the belt.

While the present invention may employ mechanism for mechanically moving the lint to a local lint gathering device, as indicated in the above-described embodiment, other embodiments of the present invention contemplate omission of such mechanical movement of the lint across a surface, and reliance only on air movement within the enclosure to concentrate the lint.

In these other embodiments it is preferred that this air movement is accomplished by vacuum equipment. Blowing equipment is very effective for merely dislodging lint resting on a surface substantially distant from the blowing source, but it is relatively ineffective for thereafter moving such dislodged lint through a remote collecting receptacle intake opening. Lint will fail to enter such an opening as long as there are any other regions of lower pressure which the blown air and lint therein can enter instead.

I have been surprised to discover that by providing, around the warp strands, an enclosure of the kind described the air velocities produced by a suction device (which is of reasonable size and which is located in a certain way with respect to the enclosure) are sufficient to dislodge lint from all of the enclosure's interior surfaces.

Thus, in another embodiment of my invention the enclosure is like that previously described except that the bottom surface is a stationary impervious sheet joined to the side walls, and air is withdrawn from this enclosure via a suction intake opening.

I have also discovered that by connecting a plurality of my novel enclosures (on a plurality of looms) to a single vacuum pump and by switching the pump suction to less than all of the enclosures at any one time, enclosure air velocities are achieved which, unexpectedly, more than make up for the periods during which the suction is being applied to other enclosures. In addition the initiation and termination of these air velocities as a result of the switching provides a variation in air flow conditions which is helpful in keeping the enclosure interiors lint free.

In still another embodiment of the invention this switching of a central station source from one enclosure or group or enclosures to another is achieved automatically in accordance with a predetermined program.

The surprising and unexpected results achieved by this invention are (1) the extraordinary length of time which can elapse before sweeping the floor and blowing off the machines and room surfaces is required, (2) the relative simplicity of the apparatus required to catch the lint and the ease with which this apparatus can be maintained, (3) the relative simplicity of the blowing equipment which can be used successfully at the extended intervals mentioned in (1) because the enclosure protects the delicate drop wire stop motion, and (4) the improvement in the quality of the cloth because the lint is removed before it has a chance to accumulate into large bunches and because there can be superior control of the atmosphere in the vicinity of the warp strands.

Accordingly, it is one object of the present invention to provide for the textile strands on a loom an enclosure which prevents the chance escape of any generated lint and from which such lint can be removed.

Another object is to provide an enclosure of the kind described which has an interior chamber of restricted volume.

Another object is to provide an enclosure of the kind described with apparatus for moving the lint therin.

Another object is to provide an enclosure of the kind described from which air is withdrawn to at least aid in moving the lint.

Another object is to provide an enclosure of the kind described in which specially treated air is supplied to the enclosure to replace any air withdrawn.

Another object is to provide an enclosure of the kind described housing the warp strand layer between the warp beam and heddles.

Another object is to provide an enclosure of the kind which has a first narrow opening at one end admitting the warp strand layer and a second wider opening at the opposite end discharging this layer in the form of a shed.

Another object is to provide an enclosure of the kind described in which the bottom of the enclosure is a moving surface carrying the lint to a device for removing the lint from such surface.

Another object is to provide an enclosure of the kind described in which the bottom of the enclosure is a moving surface carrying the lint to a suction manifold.

Another object is to provide an enclosure of the kind described in which the manifold has an intake opening connected by a duct to a point on said enclosure.

Another object is to provide an enclosure of the kind described in which the enclosure has a movable cover which when open is located well out of the way of the operator working on the loom.

Another object is to provide for the textile strands on a loom an enclosure which has no moving parts, which has openings passing the strands into and out of the enclosure interior and which has a suction air outlet communicating with said interior at a point generally remote from said openings.

Another object is to provide an enclosure of the kind described which is in a system of many similar enclosures connected by duct-work to a central suction source.

Another object is to provide a system of the kind described in which each enclosure is intermittently connected to and disconnected from said source alone or in a group of less than all such enclosures.

Other objects will appear hereinafter.

The best modes in which it has been contemplated applying the principles of the present invention are shown in the accompanying drawings, but it will be understood that these are merely illustrative, for it is intended to cover by suitable expression in the appended claims whatever of patentable subject matter exists in the invention disclosed.

In the drawings:

FIGURE 4 is a view like FIG. 3 but showing the enclosure cover open;

FIGURE 4A is a fragmentary view showing the cover latching arrangement of FIGS. 3 and 4;

FIGURE 6 is a top plan view of a portion of the belt and manifold with parts broken away for clearer showing;

Figure 1:
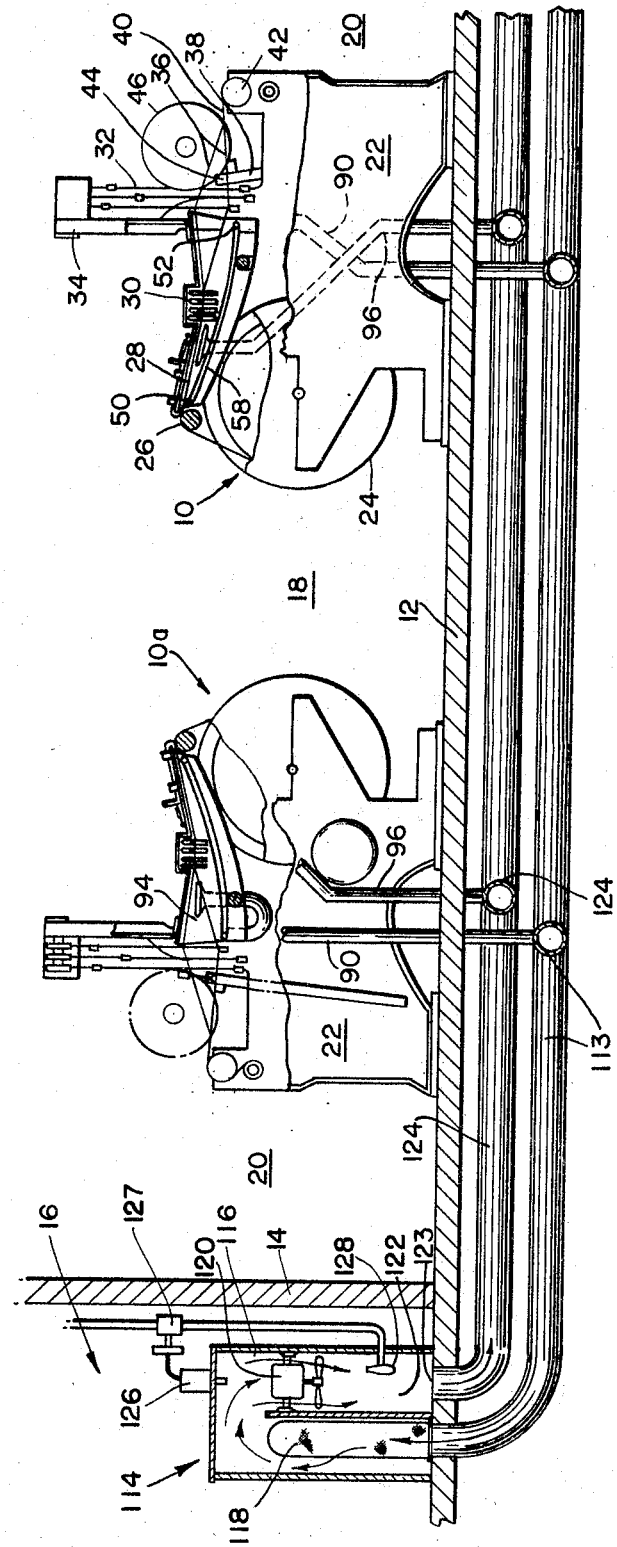
FIGURE 1 is a cross-sectioned side elevation view of a part of a textile weave shed showing looms and cleaning equipment according to the present invention.
Figure 3:
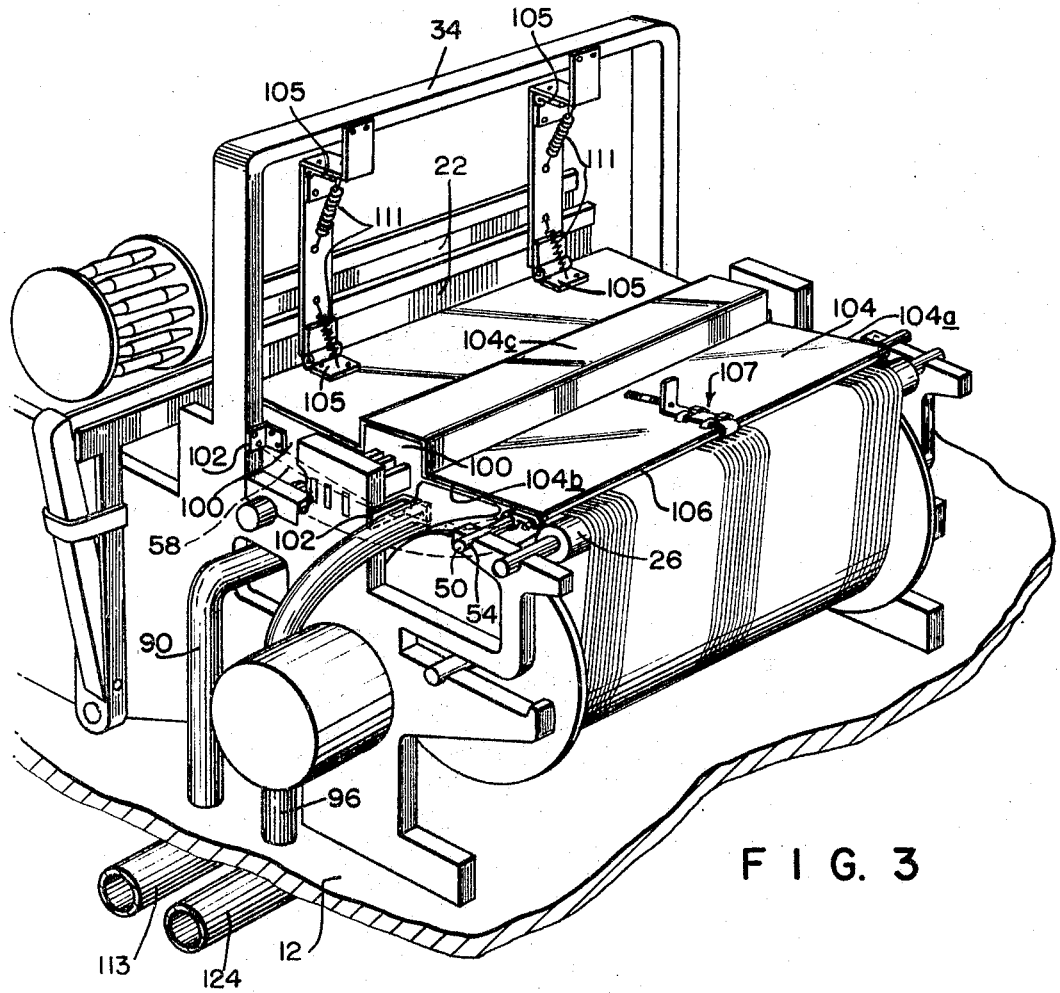
FIGURE 3 is a perspective view of one of the looms of FIGS. 1 and 2, showing the enclosure cover closed.
Figure 5:
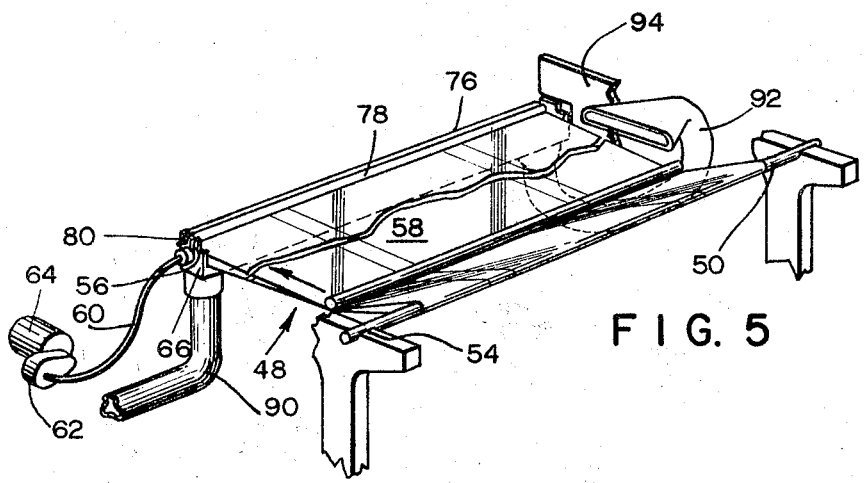
FIGURE 5 is a perspective view of the moving belt which forms the enclosure bottom in the embodiment of FIGS. 1–4 and of the suction manifold which removes the lint from the moving belt.
Figure 13:
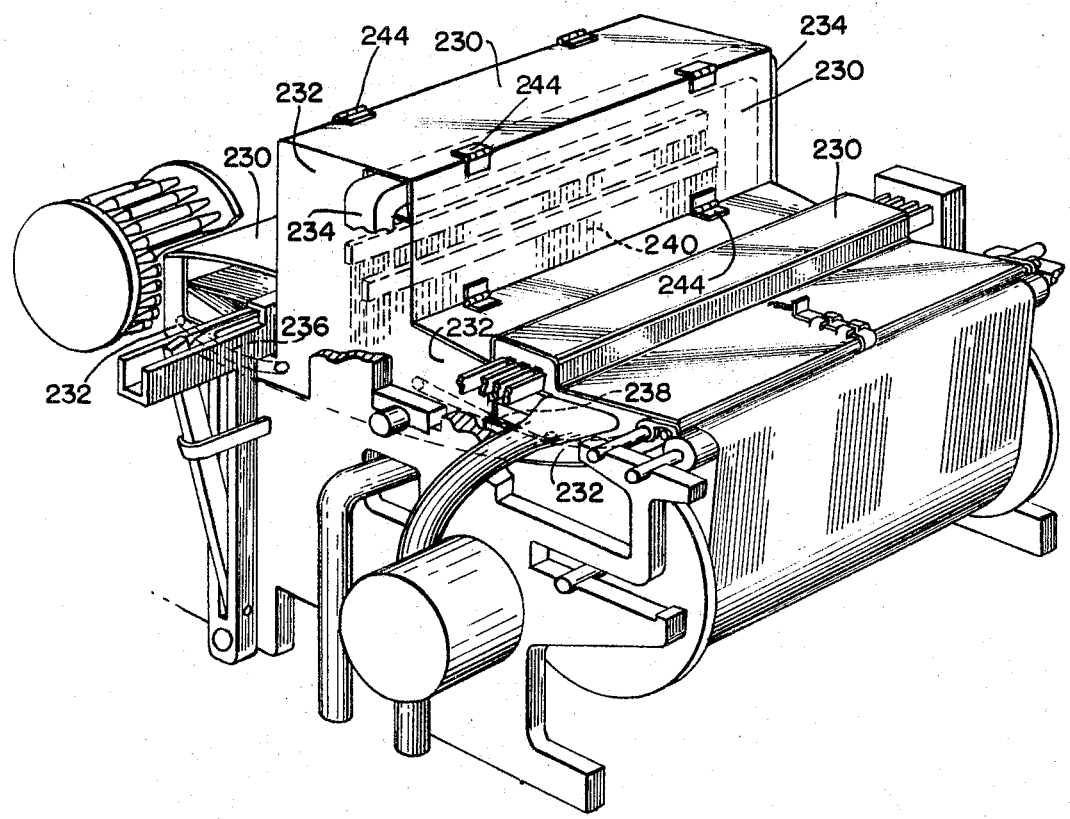

FIGURES 7 and 8 are side elevation views taken on lines 7—7 and 8—8, respectively, of FIG. 6;

FIGURE 9 is a side elevation view showing somewhat diagrammatically another embodiment of the invention in which the equipment added to the loom encloses the warp strand layer on the cloth side of the heddles;

FIGURE 10 is a perspective view of the arrangement of FIG. 9;

FIGURE 11 is a view like FIG. 1 but larger and showing another embodiment of the present invention;

FIGURE 12 is a perspective view of the enclosure used in the embodiment of FIG. 11;

FIGURE 13 is a perspective view like FIG. 3, but showing an embodiment in which one enclosure extends around the warp strands on both sides of the harness;

FIGURE 14 is a perspective view like FIG. 5 but showing how a scavenger roll can be used to remove lint from the belt;

FIGURE 14A is a fragmentary top plan view of apparatus shown in FIG. 14.

Referring now more particularly to the drawings, FIG. 1 is a somewhat diagrammatic side elevation view of two looms 10 and 10a in a weave shed having a floor 12 and one wall 14 separating the weave shed from a central air-conditioning room 16. The loom 10 has some parts broken away and some sectioned to facilitate understanding of the enclosure equipment which constitutes one embodiment of this invention, the combination of this equipment with the loom 10 and the role this combination can play in a central station air conditioning and lint collecting system.

Figure 2:
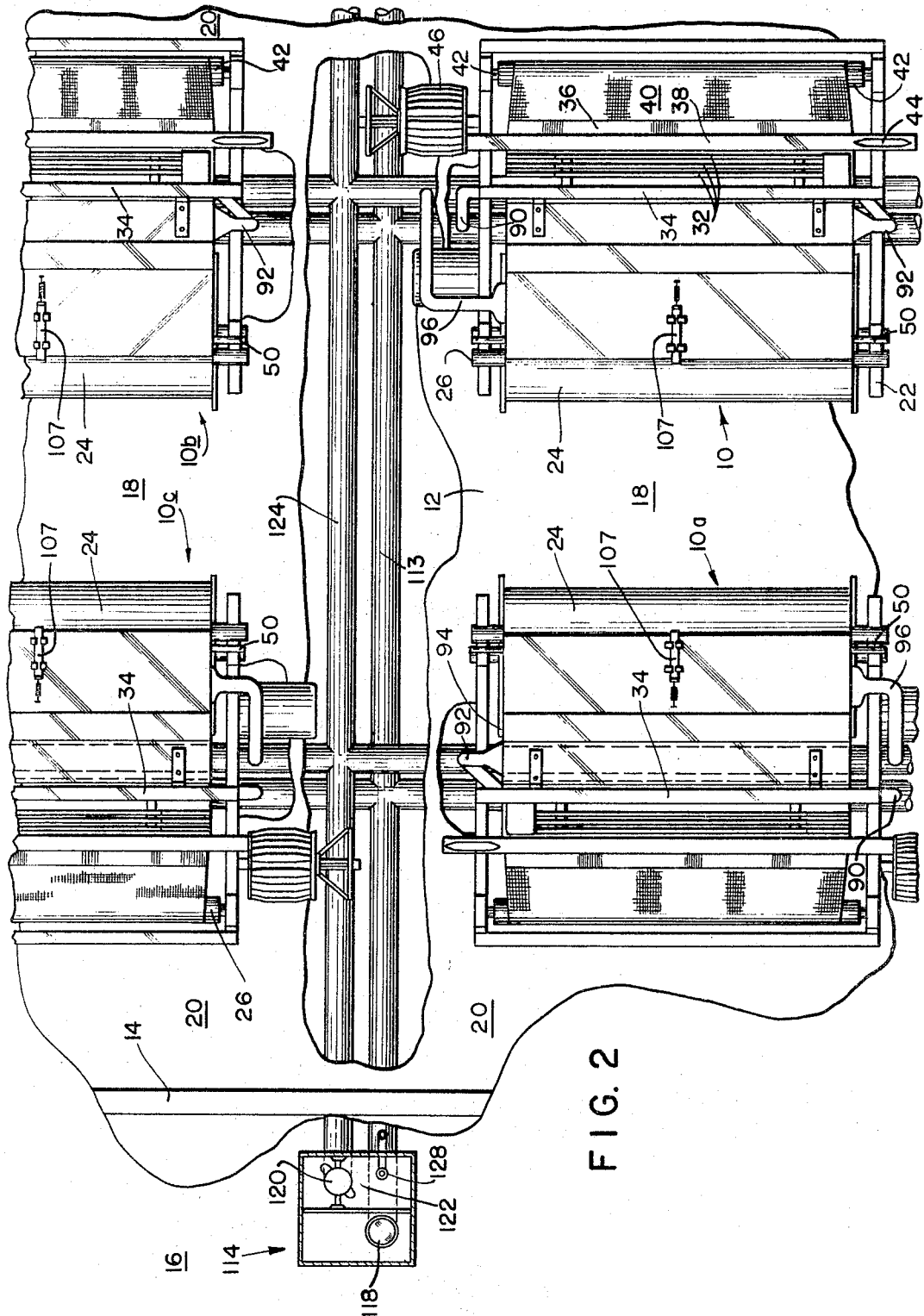
FIGURE 2 is a top plan view of the part of the weave shed, looms and equipment of FIG. 1, showing portions of the floor broken away.

The loom 10a has enclosure equipment which is identical to that of loom 10 and which therefore need not be separately described. FIG. 2 shows additional looms 10b and 10c adjacent looms 10 and 10a and further shows how the disposition of these looms in rows provides warp aisles 18 and weavers aisles 20. In the remainder of the weave room there would be, of course, many additional looms forming many more rows of which the looms shown constitute but a small portion. There might be as many as a thousand looms in a single weave room.

Referring to both FIGS. 1 and 2, the principal parts of the loom 10 are the frame 22, warp beam 24, whip roll 26, warp sheet 28, drop wires 30, heddles 32, arch 34, shed 36, lay 38, cloth 40, take up 42, shuttle 44, and bobbin battery 46. A typical loom which lends itself to the present invention is manufactured by Draper Company of Hopesdale, Massachusetts, and designated Model X–2.

The lint-enclosing, lint-collecting and air-conditioning devices for the looms of FIG. 1 include, first of all, rollers 50 and 52 which are located under the warp strand layer 28 at points closely adjacent the whip roll 26 and the heddles 32, respectively, which are parallel to the whip roll, and which have their ends journalled in bearing members 54 and 56 mounted on the loom frame (see FIG. 5). These rollers serve to support, and permit movement of, a wide endless belt 58, and one of them (52) is rotated, through a flexible cable 60 and reduction gear unit 62, by a small electrical motor 64 mounted at some convenient place on the loom frame. The belt engages the roller 52 with enough friction to move by this rotation, and the direction of drive is such that the upper layer of the belt moves toward the heddles 32.

The bearing members 54 for roller 50 are journals in parts of the loom frame, but the bearing members 56 for the roller 52 are vertical slots (see particularly FIG. 8) in the end plates 66 of an elongated suction manifold 68 which extends the length of this roller and which in turn is bolted to the loom frame. This manifold has a floor 70 spaced below the roller 52, a front wall 72 which extends upward into scraping contact with the lower belt layer as it moves toward the whip roll, and a back wall 74 which extends up along side the roller 52. The space 76 between roller 52 and the manifold back wall 74 is substantially closed by an idler roller 78 which is journalled in another set of vertical slots 80 formed in the manifold end plates 66. An extension flap 82 of the manifold back wall 74, hinged thereon at 84, rests upon the idler roller 78 to complete the boundaries of the manifold chamber 86. Lint 88 on the surface on the upper belt layer is more or less "wrung" into this chamber by rollers 52 and 78 and is carried out of chamber 86 through duct 90 by air sweeping through the manifold. Thus this duct 90 is connected to the manifold floor 70 at one end thereof, and air is admitted to the chamber 86 through an opening in the floor at the other end after having been brought to this last-mentioned opening via a short duct 92 which leads from a point along one side wall 94 of the enclosure. Thus, the air moving along the manifold chamber 86 is actually obtained from the interior of the enclosure of which the upper layer of the belt 58 forms the bottom wall.

Later herein it will be seen that this air is preferably specially treated before it is introduced into the enclosure via another duct 96 and another enclosure opening 98 located along the opposite enclosure side wall 100.

The belt 58 in this embodiment is kept running straight by a pair of spaced apart crowned segments 52a secured to roller 52 and by tapes 58a fastened to the inner belt surface in registration with these segments (see FIG. 6). More particularly, roller 52 is made up of a central axle member 52b carrying spacer cylinders 52c one on either side of, and one between, the crowned segments 52a. These spacer cylinders are free to rotate on the axle member, but the crowned segments 52a are fixed thereon, for example by set screws 52d, so that rotation of the central axle member 52b by a flexible drive shaft 60 positively drives the crowned segments and through them the belt.

The enclosure side walls 94 and 100 are generally perpendicular and extend along the opposite sides of the warp strand layer 28, with their lower inner surfaces closely adjacent the belt edges and with any suitable apertures notches, off-sets and other formations to accommodate the manifold rollers and to accommodate the drop wire supports, the loom drive shaft and any other loom components. Because of the large number of looms in service the intricacies of these side walls are probably furnished with the least difficulty and expense as molded plastic articles.

One manner of connection of the side walls to the loom frame is shown in FIGS. 3 and 4. Brackets 102 are diagrammatic representations of the fastening devices which can be employed here, but it will be understood that any suitable mounting arrangement will do.

To minimize interference with the weaver's movements the side walls 94 and 100 are made as low as possible, for example only high enough to present conveniently shaped upper edges 94a and 100a to the corresponding edges 104a and 104b on a cover 104.

To keep the cross section of the enclosure interior as small as possible (and thereby keep the velocity of air moving through the interior as high as possible for a given air pump capacity) the cover is located as close as possible to the warp strands and drop wires, for example by contouring the cover at 104c to accommodate the upper ends of the drop wires.

Hinges 105 connecting the cover to the arch enable the cover to be swung upwardly far enough to be out of the weaver's way and to give him easy access to the warp strands when he opens the enclosure. To give the enclosure rigidity and to protect the warp strand layer a bar 106 is disposed across the top of the warp strand layer 28, between the enclosure side walls 94 and 100, in the vicinity of the whip roll 26. This bar receives a latch 107 which serves to hold the cover closed. For changing the warp beam or other major operations on the loom this bar 106 is readily removable from its end supports by horizontal movement out of slots 109 after hooks 110 have been swung away. These details are particularly well shown in FIG. 4A. Springs 111 located at the hinges 105 tend to urge the cover to the open position, so that if a warp strand is broken the weaver has only to trip the latch 107 and the cover will swing open to give him access to the enclosure interior to make the repair.

From the manifold 68 the duct 90 goes down through the floor 12 of the weave room and is connected to a common conduit 113 which extends under the floor, parallel to the row of looms containing loom 10, and which receives a corresponding duct (like 90) from each loom in the row. One end of this common conduit 113 is closed and the other end enters central station air conditioning equipment 114 (usually located in a small separate room 16 in the plant) where the air passes through a filter 118, shown here somewhat diagrammatically as a changeable cloth bag. In this equipment the filtered air then passes through a fan 120 to a discharge region 122 and thence through an outlet opening 123 to a common supply conduit 124 which extends back under the floor and parallel to conduit 113 and which is connected to the looms via individual conduits 96 at each loom. The air conditioning equipment 114 includes a humidity detector 126 which controls a valve 127 supplying water to humidification nozzles 128 in discharge region 122 so that the air entering the enclosure at each loom has the proper relative humidity.

It is an important advantage to be able to supply air at the proper relative humidity to the precise regions in which the warp strands are located. Conventionally the desired relative humidity has been maintained by water spray nozzles located in the weave shed, but to give the water spray an opportunity to evaporate and not fall onto the looms as drops these nozzles are customarily located near the ceiling of the room, and hence quite far from the loom region through which the textile actually passes. Because of the heat given off by each loom a much higher relative humidity must be maintained in the rest of the room in order to achieve the desired relative humidity at the region through which the textile passes. By use of the combination of this invention it is possible to achieve a better degree of control the relative humidity at the loom, for example, within the enclosure of this invention.

FIGURES 9 and 10 show an embodiment of the present invention in which the enclosure 130 is associated with the warp layer 28 on the other side of the harness, that is to say, as it extends from the heddles 32 to the cloth 40. As in the first-described embodiment, a belt 132 serves as the bottom wall of this enclosure and is mounted on rollers 134 and 136 journalled to the loom frame and to a manifold 138 having inlet and outlet air ducts similar to the manifold 68 in FIGS. 1–8 and keeping the belt free of lint. Outlet 140 is shown. In this case, of course, the enclosure side walls 144 must be provided with curved elongated slots 148 to accommodate the reciprocating lay 38 and its arcuate movement. A duct 152 brings air to the enclosure from a common supply conduit like 124 in the embodiment of FIGS. 1–8. Another duct 153 connected to outlet 140 carries the lint-laden air from the manifold back to a common suction source. A cover 156 is shaped so that when closed it joins the upper portions of the side walls 144 and is not struck by the moving lay 38. This cover is also pivoted with respect to the arch 34 by hinges 157. Springs 158 urge the cover to an open position entirely out of the way of the operator when latches 160 are released. These latches are located on the sides of the enclosure in this embodiment.

FIGURE 11 illustrates still another embodiment of the invention in which there is no moving belt forming the bottom wall of the enclosure and in which air movement alone is relied upon to move the lint out of an enclosure 162 which houses the warp sheet 164. In this embodiment the enclosure is once again located between the warp beam 24 and the heddles 32, but it will be understood that it would be located on the other side of the harness as well.

In general, any suction equipment which is of large enough capacity to pull lint from an unenclosed surface area as large as the warp sheet could be considered impractically large, and because of this limitation mechanical means, such as the belts of the earlier-described embodiments, have been preferred to concentrate the lint at a much smaller region or surface area such as a local manifold collection station. I have discovered, however, that when the warp sheet is enclosed in the general way already described a suction system of reasonable size produces suprisingly high air velocities across the surfaces within the enclosure, high enough velocities, in fact, to keep these surfaces lint free for substantial periods of time. From past experience in this field it might have been supposed that the inevitable enclosure openings 166 and 168 for passing in and passing out the warp strand layer 164 would be too large to permit satisfactory air movement through the enclosure. Unexpectedly the velocities are very adequate, even with suction systems of modest size, and cleaning has been found to be particularly effective where the suction connection 170 on the enclosure is located substantially closer to the smaller warp strand entrance opening 166 than to the larger warp strand exit opening 168, because this tends to produce air movement through the opening 166 and between this opening and the suction connection even though it is much smaller than opening 168.

Each of the above-described embodiments involve central station lint collection equipment with duct work connecting it to the enclosures on the looms and with air pumps to move air through the duct work to the central station. While the provision of such central station equipment, duct work and enclosure devices for lint collection alone is particularly advantageous in weave rooms having serious lint accumulation problems, I have further discovered a suprisingly useful combination of such central station loom cleaning with the now widely used central station room air conditioning systems for entire mills. Such a combination makes this system practical even in weave rooms where the cleaning problems are not so acute. More particularly, by combining a system of warp strand enclosures and ducts (such as the warp strand enclosures 162, individual loom ducts 172 and common ducts 174 of FIG. 11) with a standard central station air conditioning system the common ducts and much of the central station equipment can serve two functions. Thus, referring to FIG. 11 it is conventional in textile mills to have equipment at a central station which draws in room air through a single large intake opening, filters this air, cools it, provides it with the proper relative humidity and drives it through supply ducts 182 to various distribution outlets 184 spaced around the room. Because of the large volume of air which such a system must handle the fan 186 is of considerable size, much larger, for example, than might be considered economical for a lint collection system alone at the present stage of development of the art, and I have discovered, that when the loom cleaning duct 174 is connected to the air-conditioning system intake opening 188 the same filter 190, air pump can double for the lint collection system, and the increase air pump capacity required to overcome the friction in the duct work from the loom is easily justified by the increased benefits of the cleaning. Finally, I have discovered that either in a combined loom cleaning and room air-conditioning system or in a loom cleaning system alone, the air velocities in the warp strand enclosures (like enclosures 162 of FIG. 11) can be further increased for a given central station fan by grouping the looms on several different common ducts 174 and 174a and by switching the central air intake 188 from duct 174 to 174a in accordance with some program. Switching valve 191 at Y-connection 192 illustrates somewhat diagrammatically apparatus which will achieve this mode of operation. This valve has a closure member 193 pivoted at 194 and actuated between its two positions by a lever 196 which is in turn actuated by a piston-cylinder fluid motor 198. Motor 198 is controlled by a timing device 200 driven continuously by a small electric motor 202 and alternately supplying fluid pressure from a supply 204 to opposite sides of the piston in the fluid motor 198. The purpose of this switching of the intake 188 to different air supply ducts 174 and 174a is to provide a higher velocity in a limited number of enclosure 162 than would obtain if the intake were connected to all the loom enclosures at all times. The fact that this arrangement creates periods when no air is moving through the enclosures 162 is not detrimental because the lint is never generated from the warp strands fast enough to require completely continuous air flow. In fact the intermittent turning on and off of the air flow through the enclosures 162 by the operation of a switching valve like valve 191 is believed in some cases to be better than a steady air flow, because it produces variations in air velocities which assist in dislodging lint adhering to the surfaces within the enclosure.

FIGURE 12 shows the enclosure 162 in more detail, illustrating, for example, how the side walls 206 are sealingly secured to the bottom wall 208 and have upper portions 210 which receive the corresponding edges 212 of the sides 214 of the cover 216. This cover is contoured in order to accommodate the drop wires at 218 and still remain as close as possible to the warp strands on either side of these drop wires. The bottom wall 208 has a long slot 220 thereacross with an adapted fitting 222 conducting air from the enclosure to a single flexible conduit 223. Openings 224 and 226 are representative of the provision made for loom parts, such as the drive shaft and drop wire supports, which must pass through the enclosure side walls 206.

In each of the embodiments shown the cover mounting arrangement includes a hinge at the loom arch and another hinge near the heddles. These two locations are preferred because they enable the entire cover structure to swing away from the heddles without interferring with the drop wires. It is within the scope of the invention to have only one hinge at the arch or at the cover.

FIGURE 13 illustrates an embodiment of the present invention in which the enclosure top wall 230 and the enclosure side walls 232 extend without interruption on both sides of the arch 234 to provide what is, in effect, a single enclosure. The bottom wall is in the form of two belts 236 and 238 in order that the heddles 240 may pass into the lower regions of the loom. This arrangement is particularly feasible on looms which have very low arches, such as the one shown herein in FIG. 13. The advantage of this embodiment is that it further reduces the opportunity for the escape of line from inside the enclosure through top and side enclosure openings required in the previous embodiments. Particularly on low arch looms the top and side walls of the enclosure can actually enclose the heddles and arch, leaving only the bottom wall interrupted. Hinges 244 enable the top portions on both sides of the arch to open, as in the prior embodiments.

Although it is preferred that the removal of lint from the enclosures involves some air movement through the enclosure, even when the bottom wall thereof is a moving belt, it is within the scope of this invention to employ a moving belt and scavenger roll combination, as shown in FIGS. 14 and 14A, with no air moving equipment at all. A belt 250 is mounted on a pair of rollers 252 and 254 and driven by a motor 256, gear reduction unit 258 and flexible cable 260 connected to roller 254. The roller 252 is journalled on looms parts 262 of the loom frame. The roller 254 is journalled on a bracket 264 which would be mounted on the loom frame in some convenient way, for example as the manifolds were mounted in the previous embodiments. The bracket center portion 264a extends the length of the roller 254 and has right angle end plates 264b provided with slots 264c and 264d. Slots 264c receive the ends of the roller 254. Slots 264d receive the ends of a scavenger roller 266 which rests on the belt and is rotated thereby and which picks lint off the belt surface. When the lint accumulation gets substantial the scavenger roller is lifted out of slots 264d, the lint is stripped off it and it is replaced.

What is claimed is:
1. The combination of—
(I) a textile loom having:
  (A) warp beam and cloth roll ends,
  (B) heddles between said ends,
  (C) a plurality of warp strands which: (1) extend from said heddles toward one of said loom ends,
    (2) form at least one warp sheet which:
      (a) lies generally in a plane,
      (b) extends from said heddles toward one of said loom ends,
      (c) has a substantial area defined in part by opposite edges,
(II) a warp strand enclosure having:
  (A) a bottom wall which: (1) is located on the underside of said sheet, (2) is coextensive with at least a substantial portion of said sheet area,
  (B) side walls which: (1) are located along said sheet opposite edges, (2) have lower portions joining said bottom wall, (3) have upper portions,
  (C) a top wall which (1) is located on the upperside of said sheet, (2) joins said side wall upper portions,
  (D) a first opening which: (1) is presented away from said heddles, (2) passes said sheet,
  (E) a second opening which: (1) is presented toward said heddles, (2) passes said sheet,
(III) means connected to said enclosure for removing lint therefrom.

2. The combination of—
(I) a textile loom having:
  (A) warp beam and cloth roll ends,
  (B) heddles which: (1) are disposed across said loom, (2) are substantially parallel to said ends,
  (C) a plurality of warp strands which: (1) extend from said heddles toward one of said loom ends,
    (2) form at least one warp sheet which:
      (a) lies generally in a plane,
      (b) extends from said heddles toward one of said loom ends,
      (c) has a substantial area defined in part by opposite edges,
(II) a warp strand layer enclosure having:
  (A) a bottom wall which: (1) is located on the underside of said sheet, (2) is co-extensive with at least a substantial portion of said sheet area,
  (B) side walls which: (1) are located along said sheet opposite edges, (2) have lower portions joining said bottom wall, (3) have upper portions,
  (C) a cover which: (1) is located on the upperside of said sheet, (2) is movable between:
    (a) a first position in which: (i) it is adjacent said sheet upperside, (ii) it joins said side wall upper portions,
    (b) a second position in which: (i) it is remote from said upper side of said sheet, (ii) it is spaced from said side wall upper portions,
  (D) a first opening which: (1) is defined by said walls, (2) is presented away from said heddles, (3) accommodates said sheet,
  (E) a second opening which: (1) is defined by said walls, (2) is presented toward said heddles, (3) accommodates said sheet, (III) means connected to said enclosure for continuously removing lint therefrom.

3. The combination of claim 2 wherein said enclosure bottom wall comprises a sheet of highly flexible material.

4. The combination of claim 3 having means associated with said enclosure for moving said flexible material sheet edgewise toward said lint-removing means.

5. The combination of claim 4 wherein said enclosure bottom wall further comprises a pair of spaced apart parallel rollers, wherein said flexible material sheet comprises an endless belt mounted on said rollers, and wherein said means for moving said sheet comprises a shaft connected to one of said rollers for rotating the same.

6. The combination of claim 5 wherein one of said rollers is located adjacent said first enclosure opening and wherein the other of said rollers is parallel to said one roller and is located adjacent said second enclosure opening.

7. The combination of claim 2 wherein said means for removing lint from said enclosure comprises a third opening therein, a conduit connected to said third opening and means connected to said conduit for withdrawing air from said enclosure through said third opening and conduit.

8. The combination of claim 7 wherein said third opening is between said first and second openings and spaced from each of them.

9. The combination of claim 8 wherein said third opening is located in said bottom wall.

10. The combination of claim 9 wherein said third opening is a slot substantially parallel to said heddles and extending between said enclosure side walls.

11. The combination of claim 10 wherein said conduit is connected to said third opening slot at substantially the center thereof.

12. The combination of claim 2 wherein a hinge connects said cover to said loom.

13. The combination of claim 12 wherein said heddles are supported by a loom arch and wherein said hinge has one portion secured to said cover and another portion secured to said arch.

14. The combination of claim 13 wherein said hinge has an axle and wherein said axle is located closer to said arch than to said cover.

15. The combination of claim 12 wherein a spring is connected between said cover and said arch.

16. The combination of claim 6 wherein said means for removing lint from said enclosure comprises a manifold having an opening adjacent said belt.

17. The combination of claim 16 wherein said manifold is located at the said second enclosure opening and comprises an elongated hollow container parallel to said warp beam and cloth roll.

18. The combination of claim 17 wherein said other roller is parallel to said manifold and extends along said opening therein.

19. The combination of claim 18 wherein said other roller blocks a substantial part of said manifold opening.

20. The combination of claim 19 wherein said manifold has end members and wherein said other roller is journalled in said end members.

21. The combination of claim 17 wherein said means for removing lint from said enclosure comprises a suction source and conduit, wherein said manifold has an inlet opening and an outlet opening and wherein said conduit has one end connected to said outlet opening and its other end connected to said suction source.

22. The combination of claim 21 wherein said enclosure has a third opening, wherein another conduit has one end connected to said manifold inlet opening and its other end connected to said enclosure third opening.

23. The combination of claim 22 wherein said enclosure has a fourth opening remote from said first, second, and third openings and wherein a supply conduit is connected to said fourth opening.

24. The combination of—
(I) a textile loom having:
  (A) a warp beam,
  (B) heddles,
  (C) a plurality of warp strands which: (1) extend from said warp beam toward said heddles,
    (2) form at least one warp sheet which:
      (a) lies generally in a plane,
      (b) has substantially parallel opposite edges,
      (c) has a substantial area defined in part by said opposite edges,
  (D) a drop wire mechanism which: (1) is located between said warp beam and said heddles,
    (2) extends:
      (a) across said warp strands,
      (b) beyond said opposite warp sheet edges,
  (E) a crank shaft which: (1) is located between said warp beam and said heddles, (2) extends:
      (a) across said warp strands,
      (b) beyond said opposite warp sheet edges,
(II) A warp sheet enclosure having:
  (A) a bottom wall which: (1) is on the underside of said sheet, (2) is below said drop wires, (3) is substantially coextensive with said sheet area,
  (B) side walls which: (1) are located along said opposite warp sheet edges, (2) join said bottom wall, (3) have upper portions,
  (C) a top cover which: (1) is on the upperside of said sheet, (2) is above said drop wires, (3) is substantially coextensive with said sheet area, (4) is movable between:
    (a) a first position in which it joins said side wall upper portions,
    (b) a second position in which it is remote from said side wall upper portions,
  (D) a first opening which: (1) is defined by said walls, (2) is presented away from said heddles, (3) passes said sheet,
  (E) a second opening which: (1) is defined by said walls, (2) is presented toward said heddles, (3) passes said sheet,
  (F) additional openings which: (1) are located in said side walls, (2) pass said extending drop wire and crank shaft portions,
(III) means connected to said enclosure for removing lint therefrom.

25. The combination of—
(I) a textile loom having:
  (A) a cloth roll,
  (B) heddles,
  (C) a plurality of warp strands which: (1) extend from said cloth roll toward said heddles, (2) form at least one warp sheet which:
      (a) lies generally in a plane,
      (b) has opposite edges,
      (c) has a substantial area defined in part by said opposite edges,
  (D) a lay beam which: (1) is located between said cloth roll and said heddles, (2) extends:
      (a) across said warp strand layer,
      (b) beyond the said opposite warp sheet edges,
(II) a warp sheet enclosure having:
  (A) a bottom wall which: (1) is on the underside of said sheet, (2) is below said lay beam, (3) is substantially coextensive with said sheet area,
  (B) side walls which: (1) are located along said opposite warp sheet edges, (2) join said bottom wall, (3) have upper portions,
  (C) a top cover which: (1) is on the upperside of said warp sheet, (2) is above said lay beam, (3) is substantially coextensive with said sheet area, (4) is movable between:

(a) a first position in which it joins said side wall upper portions,
(b) a second position in which it is remote from said side wall upper portions,
(D) a first opening which: (1) is defined by said walls, (2) is presented away from said heddles, (3) passes said sheet,
(E) a second opening which: (1) is defined by said walls, (2) is presented toward said heddles, (3) passes said sheet,
(F) an additional opening which: (1) is located in each of said side walls, (2) is elongated, (3) passes said lay beam,
(III) means connected to said enclosure for removing lint therefrom.

26. The combination of—
(I) a plurality of textile looms:
(A) which are arranged in a row,
(B) each of which has: (1) warp beam and cloth roll ends, (2) heddles between said ends, (3) a plurality of warp strands which:
(a) extend from said heddles toward one of said loom ends,
(b) form at least one warp sheet which: (i) lies generally in a plane, (ii) has opposite edges, (iii) has a substantial area defined in part by said opposite edges,
(4) a warp sheet enclosure having:
(a) a bottom wall which: (i) is on the underside of said warp sheet, (ii) is coextensive with at least a substantial portion of said sheet area,
(b) side walls which: (i) are located along said opposite warp sheet edges, (ii) join said bottom wall,
(c) a top wall which: (i) is on the upperside of said warp sheet, (ii) is substantially coextensive with said bottom wall,
(d) a first opening which: (i) is defined by said walls, (ii) is presented away from said heddles, (iii) passes said warp sheet,
(e) a second opening which: (i) is defined by said walls, (ii) is presented toward said heddles, (iii) passes said warp sheet,
(II) a lint collection station which:
(A) is remote from said looms,
(B) has an air intake and an air outlet,
(C) has means for moving air into said intake and out of said outlet,
(III) an elongated suction conduit which:
(A) extends along said row of looms,
(B) has connections with each of said enclosures,
(C) is connected to said collection station intake.

27. The combination of claim 26 wherein each enclosure includes a separate elongated manifold which has an air intake opening and an air outlet opening and wherein said conduit connections with said enclosures are with said manifold air outlets.

28. The combination of claim 26 wherein an elongated pressure conduit extends along said row of looms, and wherein said pressure conduit has connections with each of said enclosures and with said collection station air outlet.

29. The combination of claim 28 wherein each enclosure includes a separate manifold which has an air intake opening and an air outlet opening, wherein said suction conduit connections are to a said manifold air outlet and wherein said pressure conduit connection to each said enclosure is remote from said manifold.

30. The combination of—
(I) a weave room which is enclosed by:
(A) walls,
(B) floor,
(C) ceiling,
(II) a plurality of textile looms:
(A) which are mounted on said weave room floor,
(B) which are arranged in rows,
(C) each of which has: (1) warp beam and cloth roll ends, (2) heddles between said ends, (3) a plurality of warp strands which:
(a) extend from said heddles toward one of said loom ends,
(b) form at least one warp sheet which: (i) lies generally in a plane, (ii) has opposite edges, (iii) has a substantial area defined in part by said opposite edges,
(4) a warp sheet enclosure having:
(a) a bottom wall which: (i) is on the underside of said sheet, (ii) is coextensive with at least a substantial portion of said sheet area,
(b) side walls which: (i) are located along said opposite warp sheet edges, (ii) join said bottom wall,
(c) a top wall which: (i) is on the upperside of said warp sheet, (ii) is substantially coextensive with said bottom wall,
(d) a first opening which: (i) is defined by said walls, (ii) is presented away from said heddles, (iii) passes said warp strand layer,
(e) a second opening which: (i) is defined by said walls, (ii) is presented toward said heddles, (iii) passes said warp sheet.
(III) an air conditioning equipment station which:
(A) is remote from said looms,
(B) has an interior chamber,
(C) has an air intake and an air outlet,
(D) has means for moving air into said intake through said chamber and out of said outlet,
(E) has means for changing the relative humidity of air passing through said chamber,
(IV) an elongated suction conduit which:
(A) extends along a row of said looms,
(B) has branch connections with said enclosures on looms in said row,
(C) is connected to said air conditioning equipment station intake,
(V) means connected with said air conditioning equipment outlet for distributing said conditioned air through said weave shed.

31. The combination of claim 30 wherein said elongated suction conduit is located beneath said weave room floor.

32. The combination of claim 30 wherein said air conditioning equipment station is located within said weave room.

33. The combination of claim 30 wherein said distributing means comprises another elongated conduit.

34. The combination of claim 33 wherein said other conduit also has branch connections with said enclosures on looms in said row.

35. The combination of—
(I) a textile loom having:
(A) warp beam and cloth roll ends,
(B) heddles between said ends,
(C) a plurality of warp strands which: (1) extend from said heddles toward one of said loom ends, (2) form at least one warp sheet which:
(a) lies generally in a plane,
(b) extends from said heddles toward one of said loom ends,
(c) has a substantial area defined in part by opposite edges,
(II) a warp strand enclosure having:
(A) a bottom wall which: (1) is located on the underside of said sheet, (2) is coextensive with at least a substantial portion of said sheet area, (B) side walls which: (1) are located along said sheet opposite edges, (2) have lower portions joining said bottom wall, (3) have upper portions,
(C) a top wall which: (1) is located on the upper side of said sheet, (2) joins said side wall upper portions,
(D) an opening which: (1) is presented away from said heddles, (2) passes said sheet,
(III) means connected to said enclosure for removing lint therefrom.

36. The combination of—
(I) a textile loom having:
  (A) warp beam and cloth roll ends,
  (B) heddles between said ends,
  (C) a plurality of warp strands which: (1) extend from said heddles toward both of said loom ends, (2) form at least one warp sheet which:
    (a) lies generally in a plane,
    (b) extends from said warp beam to said cloth roll ends,
    (c) has a substantial area,
(II) a warp strand enclosure having:
  (A) a bottom wall which: (1) is located on the underside of said sheet, (2) has an aperture therethrough passing said heddles,
  (B) side walls which: (1) are located along edge portions of said sheet, (2) have lower portions joining said bottom wall at least on either side of said aperture therein, (3) have upper portions, (4) extend along side of said heddles,
  (C) a top wall which: (1) is located on the upper side of said sheet, (2) joins said side wall upper portions, (3) extends over said heddles,
  (D) a first opening which: (1) is along said warp beam loom end, (2) admits said layer into said enclosure,
  (E) a second opening which: (1) is along said cloth roll loom end, (2) discharges said layer from said enclosure,
(III) means connected to said enclosure for removing lint therefrom.

References Cited by the Examiner

UNITED STATES PATENTS

| | | | |
|---|---|---|---|
| 2,421,135 | 5/1947 | Walter et al. | 139—1 |
| 2,582,092 | 1/1952 | Ancet | 139—1 X |
| 3,113,351 | 12/1963 | Naegeli | 19—263 |
| 3,238,974 | 3/1966 | Maguire | 139—1 |

FOREIGN PATENTS

| | | |
|---|---|---|
| 670,631 | 1/1931 | Germany. |
| 1,385,540 | 12/1964 | France. |

MERVIN STEIN, *Primary Examiner.*

H. S. JAUDON, *Assistant Examiner.*